United States Patent Office 2,845,405
Patented July 29, 1958

2,845,405

EMULSION POLYMERIZATION IN SYSTEMS CONTAINING OXIDIZED ALKYLBENZENE SULFONATES

Carl A. Uraneck, Phillips, and Walyn L. Gibson, Borger, Tex., assignors to Phillips Petroleum Company, a corporation of Delaware No Drawing. Application December 1, 1955
Serial No. 550,500

10 Claims. (Cl. 260—84.3)

This invention relates to emulsion polymerization in systems containing oxidized alkylbenzene sulfonates. In a further aspect this invention relates to the production of polymeric materials of high molecular weight. In a further aspect, this invention relates to a polymerization system providing more uniform rates of polymerization.

Polymerization of compounds containing an active vinylidene group has been practiced for many years and a considerable variety of polymerization recipes have been developed. One of the catalyst systems currently being widely used in the redox system, the essential ingredients of such a catalyst system comprising an oxidant, and a reductant. These systems are well known and the ferrous sulfate-potassium pyrophosphate, peroxamine, and sulfoxylate recipes are important examples thereof.

One difficulty in these systems is non-uniform polymerization rates. The polymerization progresses rapidly in the early stages of the polymerization but slows down after an appreciable portion of the monomers have been polymerized. This makes process control difficult. Furthermore, it is often difficult to obtain substantially complete conversion.

The following are objects of this invention.

An object of this invention is to polymerize unsaturated organic compounds. Another object of this invention is to provide an improved process for the production of synthetic rubber. A further object of this invention is to provide a polymerization system which results in more uniform polymerization rates and/or higher conversion at lower oxidant levels.

Other objects of this invention will become apparent to one skilled in the art from the accompanying disclosure and discussion.

Broadly stated, our invention comprises the substitution of oxidized alkylbenzene sulfonates for the peroxidic, including hydroperoxidic, oxidant in emulsion polymerization recipes. These materials, which function as initiators, can be used in any aqueous emulsion polymerization system wherein oil-soluble peroxides, including hydroperoxides, have previously been used. These oxidized alkylbenzene sulfonates have many advantages over the initiators previously used by workers in the art. These advantages are primarily dependent upon the fact that these initiators are water soluble and surface active. In the first place, short-stopping such a system is a simple matter. Additionally, the oxidant can be charged in the soap solution, this eliminating the present practice of charging hydrocarbon-soluble oxidants, such as cumene hydroperoxide (phenyl - α,α-dimethyl-hydroperoxymethane), in a small portion of styrene. This soap charging procedure eliminates one more possibility of error.

These oxidized alkylbenzene sulfonates provide more uniform polymerization rates which, in turn, gives better process control. They were more safely used because these new oxidants can be handled as aqueous solutions rather than as solutions of a hydrocarbon soluble oxidant having the oxidant dissolved therein. Because of the nature of the coagulation step and of the elastomer, it is easier to eliminate a water-soluble contaminant. These oxidants are usable in a great variety of redox systems and can be used in the high solids systems. In plant operation, there is less chance of accumulating undesirable compounds in the recycle monomers arising from the use of a water-soluble oxidant than from a hydrocarbon soluble oxidant. The new oxidants can be used at lower millimole levels to give the same rate of conversion as that obtained with conventional oxidants. This provides the additional advantage that less shortstop is required at the termination of the polymerization. These advantages have all become apparent while we have been working with a large variety of polymerization systems.

These oxidized alkylbenzene sulfonates, in addition to providing uniform reaction rates, also permit carrying the polymerization to substantially quantitative conversion. This advantage is important in plant operation since the step of removal and recovery of unreacted monomers can be eliminated.

In the past, it has been recognized that fatty acid soaps can be oxidized and used in emulsion polymerization systems. However, this system has not been widely used because of the unsatisfactory results resulting from such operation. Results have been particularly poor when making cold rubber, rubber produced by polymerizing at a temperature below 86° F. (30° C.). These oxidized fatty acid soaps do not give conversions as high nor as uniform polymerization rates as do the oxidized alkylbenzene sulfonates of this invention. Furthermore, fatty acid soap hydroperoxides are relatively unstable.

The surface active oxidants of this invention are prepared from the sodium, potassium, or ammonium alkylbenzene sulfonates. One or more alkyl groups can be present but generally the total number of carbon atoms in the alkyl groups is in the range between 8 and 20, preferably within the range between 10 and 16, it being understood that the term "alkylbenzene" covers compounds in which one or more alkyl substituents are present in the aromatic nucleus, the following compounds being representative: sodium tert-dodecylbenzene sulfonate, sodium decyltoluene sulfonate, potassium octylxylene sulfonate, ammonium di-tert-hexylbenzene sulfonate, ammonium octylbenzene sulfonate, ammonium eicosylbenzene sulfonate, potassium 2-ethyl-4-dodecylbenzene sulfonate and sodium tert-octylnaphthalene sulfonate.

We have carried out the oxidation of these sulfonates in the solid form and in aqueous solution. Oxidation in an aqueous solution provides one desirable method since the solution is immediately available for use in the polymerization process. This was carried out by passing a free oxygen-containing gas over the surface of the solution and stirring vigorously while maintaining a temperature within the range of 60 to 100° C. Sometimes foaming becomes a problem and the addition of an anti-foam agent is desirable in such instances. The concentration of the sulfonate in the solution can vary widely, the range of 10 to 50 percent usually being used, a concentration of 20 percent being used in the greater part of our work. Both the rate of oxidation and the maximum active oxygen content are dependent upon the temperature used. For instance, seven days treatment at 75° C. provided an oxygen content of 0.23 weight percent active oxygen based on the original solids charged. The oxygen content is believed to be hydroperoxide oxygen although a portion thereof may be present as peroxidic oxygen. The active oxygen content was determined by the method of Wagner et al., Anal. Chem. 19, 976 (1947). Using a higher temperature during the oxidation, 95° C., active oxygen content of approximately 0.2 percent can be obtained in about two days.

During the oxidation period a general pattern has been observed, this comprising an induction period followed by an oxidation period, the attainment of a maximum active oxygen content, and finally a decrease in the amount of active oxygen content. This reaction can be followed by measuring the pH of the system, this pH undergoing a gradual lowering during the oxidation followed by an abrupt decrease which coincides with a maximum in the active oxygen content. Buffers can be added in order to provide an oxidized product having a greater oxygen content.

High oxygen content can be obtained by oxidizing the alkylbenzene sulfonate in the solid form. This is preferably done by providing a layer of the material which is exposed to elevated temperature in an air oven. This layer is preferably not over ½ inch in thickness for best results. Temperatures in the range of 60 to 100° C. should be used for this oxidation since only a trace of active oxygen is present when the oxidation is carried out at temperatures above 100° C. and extremely long times are required below 60° C. Within the preferred temperature range a period of 4 to 10 days is usually necessary depending, of course, upon the temperature and the degree of active oxygen desired. The rate of oxidation can be increased by stirring the material at intervals. The material can be repowdered by crushing or grinding it periodically during the oxidation period and thus increase rate of oxidation.

As stated, these water soluble, surface active oxidants are applicable in emulsion polymerization systems in which oil soluble hydroperoxides are normally employed. Included in these recipes are the iron pyrophosphate/hydroperoxide, peroxamine, and sulfoxylate recipes.

The monomeric material polymerized to produce polymers by the process of this invention comprise unsaturated organic compounds which contain the characteristic structure $CH_2=C<$ group and, in most cases, have at least one of the disconnected valences attached to an electronegative group, that is, a group which increases the polar character of the molecule such as a chlorine group or an organic group containing a double or triple bond such as vinyl, phenyl, cyano, carboxy or the like. Included in this class of monomers are the conjugated dienes, such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chloro-styrene, p-methoxy-styrene, alpha-methylstyrene, vinylnaphthalene and similar derivatives thereof, and the like; vinylpyridines such as 2-vinylpyridine, 2-methyl-5-vinylpyridine, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like; methyl isopropenyl ketone; methyl vinyl ketone; methyl vinyl ether; vinylethinyl alkyl carbinols; vinyl acetate; vinyl chloride; vinylidene chloride; vinylfurane, vinylcarbazole; vinylacetylene; and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diene or a mixture of such a conjugated diene with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

According to the process of this invention the materials to be polymerized are caused to react in aqueous emulsion in the presence of a modifying agent, such as a mercaptan, an activator composition, such as one prepared from a ferrous salt, such as ferrous sulfate, and a pyrophosphate of a monovalent cation, such as an alkali metal or ammonium, and a suitable emulsifying agent. One procedure which can be employed for charging the ingredients to the reactor in a butadiene-styrene copolymerization is to dissolve the initiator in the water solution of the emulsifying agent and charge this mixture to the reactor, after which the mercaptan, which is admixed with the styrene, is introduced. The butadiene is then added, the temperature of the reactants adjusted to the desired level, and polymerization started by injection of an aqueous dispersion of the ferrous sulfate-sodium pyrophosphate activator. The reactants are agitated throughout the polymerization period while the temperature is held constant. When the desired conversion has been reached the reaction is shortstopped, and the polymer is treated with an antioxidant, coagulated, and dried in the conventional manner. While the above described method represents a specific operating procedure, numerous variations can be employed.

The polymerization systems suitable for use with these activators can be used at any of the known polymerization temperatures. We believe that these activators will find their greatest use in low temperature polymerization, i. e., from 10° C. to minus 70° C. in recipes for subfreezing temperatures, antifreeze agents are used and either salt or alcohol antifreeze agents can be employed. The activator used can be added either continuously or intermittently although, since this invention provides uniform polymerization rates, it is frequently desirable to add all the ingredients at the start of the polymerization reaction.

Emulsifying agents which are applicable in these systems are materials such as potassium laurate, potassium oleate and the like. Also, alkylbenzene sulfonates can be used, these being distinguished from the oxidized material which is used as the initiator in the present invention.

The pH of the aqueous phase can be varied over a rather wide range without producing deleterious effects on the conversion rate or the properties of the polymer. In general, the pH is in the range of 9.0 to 11.8, with the narrower range of 9.5 to 10.5 being most generally preferred.

The mercaptans applicable in this invention are usually alkyl mercaptans, and these may be of primary, secondary, or tertiary configuration, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like satisfactory modification is obtained when 0.05 to 0.3 part mercaptan per 100 parts monomers, but smaller or larger amounts may be employed in some instances. In fact, amounts as large as 1 part per 100 parts of monomers may be used. Thus the amount of mercaptan is adjusted to suit the case at hand.

The amount of oxidized alkylbenzene sulfonate used should be within the range of 0.1 to 20 millimols, with 0.2 to 5 millimols preferred, per 100 parts of the monomers. Obviously, the amount of initiator used will depend upon the active oxygen content thereof. The active oxygen content should be at least 0.002 and we prefer to use initiators having an active oxygen content of 0.05 to 2 percent by weight. In the examples, the sulfonate used was sodium dodecylbenzene sulfonate and this material when oxidized has a theoretical maximum active oxygen content of 4.2 percent by weight assuming one active oxygen atom per molecule. On this basis, it is apparent that the degree of oxidation ranges up to approximately 50 mol percent. The sulfonates can be prepared from various alkylated aromatics such as propylene tetramer alkylate, kerosene alkylate, and other aromatic alkylates with side chains capable of being oxidized to peroxidic materials under relatively mild conditions.

The following examples disclose work done in accordance with this invention. These examples illustrate the many advantages obtainable when operating thereby. Study of these examples will show that these oxidized alkylbenzene sulfonates are relatively stable in aqueous solutions, that high conversions are possible, that the recipes are suitable for the production of high solids latices, i. e., less than 100 parts of water per 100 parts by weight of monomer, and that the rate of polymerization is more uniform than when conventional initiators are used. These examples are set forth to provide preferred recipes and operating conditions and it is pointed out that the invention should not be unduly limited thereby.

EXAMPLE I

Sodium dodecylbenzene sulfonate (Santomerse 3) was oxidized to an active oxygen content of 0.47 percent by standing in contact with air at room temperature for a period of months and ten percent aqueous solutions were prepared. The pH was adjusted to different values using $NaH_2PO_4 \cdot H_2O$ or $Na_3PO_4 \cdot 12H_2O$ as a buffer. The solutions were heated to 60° C. in capped bottles and stability was determined over a 10-day period. Results were as follows:

| Buffer | pH | | Active Oxygen, Weight Percent After— | | | |
|---|---|---|---|---|---|---|
| | Original | Final | 0 Days | 1 Day | 3 Days | 10 Days |
| $NaH_2PO_4 \cdot H_2O$ | 3.8 | 3.4 | 0.47 | 0.40 | 0.32 | 0.26 |
| $NaH_2PO_4 \cdot H_2O$ | 5.8 | 4.8 | 0.46 | 0.47 | 0.42 | 0.39 |
| | 7.3 | 5.5 | 0.47 | 0.45 | 0.44 | 0.40 |
| $Na_3PO_4 \cdot 12H_2O$ | 11.1 | 9.3 | 0.47 | 0.39 | 0.33 | 0.28 |

The most stable solutions were those having an initial pH of 5.8–7.3.

EXAMPLE II

The stability of oxidized sodium dodecylbenzene sulfonate (Santomerse 3) having an active oxygen content of 0.75 percent was studied in different aqueous soap solutions. Tests were made in covered beakers at a temperature of approximately 25° C. over a period of 30 days. The following results were obtained:

TABLE—EXAMPLE II

| Run | Emulsifier | | | | Original | | 2 Days | | 9 Days | | 16 Days | | 23 Days | | 30 Days | |
| | Type | Neutralization, percent | Concentration, percent | Oxidized Santomerse, percent | pH | Active Oxygen, percent | pH | Active Oxygen, percent | pH | Active Oxygen, percent | pH | Active Oxygen, percent | pH | Active Oxygen, percent | pH | Active Oxygen, percent |
|---|---|---|---|---|---|---|---|---|---|---|---|---|---|---|---|---|
| 1 | K Oleate | 95 | 5 | | 9.6 | 0.00 | 9.5 | 0.00 | 9.4 | 0.04 | 9.4 | 0.04 | 9.4 | 0.05 | 9.3 | 0.01 |
| 2 | do | 90 | 5 | 1 | 9.3 | 0.12 | 9.3 | 0.12 | 9.3 | 0.13 | 9.3 | 0.12 | 9.2 | 0.13 | 9.1 | 0.14 |
| 3 | do | 95 | 5 | 1 | 9.5 | 0.11 | 9.4 | 0.12 | 9.3 | 0.13 | 9.2 | 0.13 | 9.3 | 0.15 | 9.1 | 0.20 |
| 4 | do | 100 | 5 | 1 | 9.9 | 0.12 | 9.8 | 0.13 | 9.4 | 0.14 | 9.3 | 0.15 | 9.2 | 0.20 | 8.9 | 0.43 |
| 5 | K Stearate | 90 | 5 | 1 | 10.6 | 0.12 | 10.4 | 0.12 | 9.9 | 0.12 | 10.3 | 0.10 | 10.1 | 0.10 | 9.5 | 0.10 |
| 6 | do | 95 | 5 | 1 | 10.7 | 0.13 | 10.4 | 0.13 | 10.2 | 0.12 | 10.4 | 0.11 | 10.2 | 0.10 | 9.7 | 0.11 |
| 7 | do | 100 | 5 | 1 | 10.7 | 0.12 | 10.5 | 0.13 | 10.3 | 0.13 | 10.5 | 0.10 | 10.3 | 0.10 | 10.0 | 0.10 |
| 8 | Dresinate 214 [1] | Original | 5 | 1 | 9.3 | 0.13 | 9.3 | 0.13 | 9.2 | 0.15 | 9.1 | 0.14 | 9.0 | 0.14 | 9.2 | 0.22 |
| 9 | Dresinate 731 [2] | do | 5 | 1 | 9.3 | 0.13 | 9.3 | 0.12 | 9.2 | 0.14 | 9.3 | 0.12 | 9.2 | 0.09 | 9.2 | 0.11 |
| 10 | | | | 1 | 7.8 | 0.13 | 6.4 | 0.12 | 7.5 | 0.11 | 6.0 | 0.13 | 6.1 | 0.14 | 6.1 | 0.17 |
| 11 | KOSR [3] | Original | 5 | 1 | 10.4 | 0.13 | 10.3 | 0.12 | 10.1 | 0.12 | 10.1 | 0.13 | 9.8 | 0.14 | 9.7 | 0.17 |
| 12 | KOSR [3] | do | 5 | | 10.5 | 0.00 | 10.5 | 0.00 | 10.3 | 0.00 | 10.2 | 0.00 | 10.0 | 0.00 | 9.8 | 0.00 |

[1] Potassium rosin soap.
[2] Sodium salt of a disproportionated rosin acid.
[3] Potassium Office Synthetic Rubber soap.

These data indicate that the oxidized Santomerse 3 is sufficiently stable in the various soap solutions to permit charging this oxidant in the aqueous phase in emulsion polymerization systems. Oxidized sodium oleate, when prepared and tested under similar conditions, is relatively unstable.

EXAMPLE III

Oxidized Santomerse 3 (sodium dodecylbenzene sulfonate) containing 1.12 weight percent active oxygen and oxidized methyl oleate (prepared according to method of J. Am. Chem. Soc., 74, 4882 (1952)), containing 3.18 weight percent active oxygen have been compared as oxidants in a 41° F. emulsion polymerization recipe at 0.25 and 0.5 millimol levels. The effect on the polymerization rate of boiling the oxidants in the soap solution before charging was also compared. Four parts of KOSR soap (potassium Office Synthetic Rubber soap) or four parts of Dresinate 214 (potassium rosin soap) was employed as emulsifier. The polymerization recipe was as follows:

|  | Parts by weight |
|---|---|
| Butadiene | 70. |
| Styrene | 30. |
| Water | 180. |
| KOSR soap | 4 or none. |
| Dresinate 214 | 4 or none. |
| KCl | 0.3. |
| Oxidized Santomerse 3 (1.12% active oxygen) | 0.357 (¹), 0.716 (²) or none. |
| Oxidized methyl oleate (3.18% active oxygen) | 0.126 (¹), 0.252 (²) or none. |
| Santomerse 3 | 0.357 or none. |
| Methyl oleate | 0.126 or none. |
| $FeSO_4 \cdot 7H_2O$ | 0.070 (¹) or 0.139 (²). |
| $K_4P_2O_7$ | 0.083 (¹) or 0.165 (²). |
| Tertiary dodecyl mercaptan | 0.4. |

[1] 0.25 mmole.
[2] 0.50 mmole.

Results of the several runs were as follows:

| Run No. | Oxidized Santomerse 3,[1] mmole | Oxidized Methyl Oleate,[1] mmole | Conversion, Percent in— | | |
|---|---|---|---|---|---|
| | | | 1.1 hrs. | 8.2 hrs. | 20.0 hrs. |
| | | 4.0 Parts KOSR Soap | | | |
| 1 | 0.25 | ---- | 15 | 80 | 98 |
| 2 | ---- | 0.25 | 13 | 23 | 29 |
| 3 | 0.50 | ---- | 27 | 94 | 99 |
| 4 | ---- | 0.50 | 21 | 84 | ---- |
| 5 [2] | 0.25 | ---- | 20 | 82 | 99 |
| 6 [2] | ---- | 0.25 | 11 | 18 | 19 |
| 7 [2] | 0.50 | ---- | 24 | 97 | 98 |
| 8 [2] | ---- | 0.50 | 14 | 28 | 35 |
| 9 [3] | 0.25 | ---- | 15 | 80 | 99 |
| 10 [4] | ---- | 0.25 | 13 | 28 | 34 |
| | | 4.0 Parts Dresinate 214 | | | |
| 11 | 0.25 | ---- | 3 | 38 | 66 |
| 12 | ---- | 0.25 | 0 | 1 | 0 |

[1] Corresponding mmole levels of $FeSO_4 \cdot 7H_2O$ and $K_4P_2O_7$.
[2] Oxidant was added to soap solution and soap solution boiled.
[3] Recipe contained 0.126 part methyl oleate.
[4] Recipe contained 0.357 part Santomerse 3.

Data show that the systems containing oxidized Santomerse 3 were much more efficient than those containing oxidized methyl oleate. The systems containing oxidized Santomerse 3 and KOSR soap attained very high conversions whether 0.25 or 0.5 mmole of initiator (oxidant) was used.

EXAMPLE IV

Runs were made to compare the polymerization systems of the present invention with similar systems in which diisopropylbenzene hydroperoxide was employed as the oxidant. The following 41° F. emulsion polymerization recipes were employed:

| | Parts by Weight | | | |
|---|---|---|---|---|
| | Recipe 1 | Recipe 2 | Recipe 3 | Recipe 4 |
| Butadiene | 70 | 70 | 70 | 70 |
| Styrene | 30 | 30 | 30 | 30 |
| Water | 70 | 70 | 70 | 70 |
| KOSR soap [1] | 3.5 | 3.5 | 3.0 | 3.0 |
| KCl | 0.8 | 0.8 | 0.8 | 0.8 |
| Santomerse 3 [2] | ---- | 0.32 | ---- | 0.48 |
| Oxidized Santomerse 3 (0.50% active oxygen) | [3] 0.32 | ---- | [4] 0.48 | ---- |
| Diisopropylbenzene hydroperoxide | ---- | [5] 0.021 | ---- | [5] 0.032 |
| $FeSO_4 \cdot 7H_2O$ | [3] 0.028 | [3] 0.028 | [4] 0.042 | [4] 0.042 |
| $K_4P_2O_7$ | [3] 0.033 | [3] 0.033 | [4] 0.049 | [4] 0.049 |
| Tertiary dodecyl mercaptan | 0.4 | 0.4 | 0.4 | 0.4 |

[1] Potassium Office Synthetic Rubber soap.
[2] Sodium dodecylbenzene sulfonate.
[3] 0.10 mmole.
[4] 0.15 mmole.
[5] 0.11 mmole.
[6] 0.16 mmole.

*Polymerization data*

| Time, Hours | Conversion, Percent | | | |
|---|---|---|---|---|
| | Recipe 1 | Recipe 2 | Recipe 3 | Recipe 4 |
| 5.0 | 25 | 10 | 28 | 29 |
| 16.8 | 59 | 8 | 60 | 41 |
| 29.5 | 85 | 12 | 82 | 44 |

These data show that the initiators of this invention are quite suitable in the production of high solids latices and that they can be used at lower levels than the diisopropylbenzene hydroperoxide, one of the better oxidants of the prior art.

EXAMPLE V

Three runs were made for the copolymerization of butadiene with styrene at 41° F. using the following emulsion polymerization recipes:

| | Parts by Weight | | |
|---|---|---|---|
| | Recipe 1 | Recipe 2 | Recipe 3 |
| Butadiene | 70 | 70 | 70 |
| Styrene | 30 | 30 | 30 |
| Water | 180 | 180 | 180 |
| KOSR soap [1] | 4 | 4 | 4 |
| KCl | 0.3 | 0.3 | 0.3 |
| Tertiary dodecyl mercaptan | 0.24 | 0.24 | 0.24 |
| Diisopropylbenzene hydroperoxide | ---- | [3] 0.049 | [3] 0.049 |
| Oxidized Santomerse 3 (0.74% active oxygen) | [4] 0.5 | ---- | ---- |
| Santomerse 3 [2] | ---- | 0.5 | ---- |
| $FeSO_4 \cdot 7H_2O$ | [5] 0.10 | [5] 0.10 | [5] 0.10 |
| $K_4P_2O_7$ | [6] 0.119 | [6] 0.119 | [6] 0.119 |

[1] Potassium Office Synthetic Rubber soap.
[2] Sodium dodecylbenzene sulfonate.
[3] 0.25 mmole.
[4] 0.23 mmole.
[5] 0.36 mmole.
[6] 0.36 mmole.

Polymerization data

| Time, Hours | Recipe 1 | | | Recipe 2 | | | Recipe 3 | | |
|---|---|---|---|---|---|---|---|---|---|
| | Conv., Percent | Rate per Hour | Deviation | Conv., Percent | Rate per Hour | Deviation | Conv., Percent | Rate per Hour | Deviation |
| 1 | 4.1 | 4.1 | 0.4 | 6 | 6 | 1.3 | 3 | 3 | 0.8 |
| 2 | 7.2 | 3.6 | 0.1 | 12 | 6 | 1.3 | 9 | 4.5 | 0.7 |
| 4 | 16.7 | 4.2 | 0.5 | 21 | 5.3 | 0.6 | 22 | 5.5 | 1.7 |
| 8 | 34 | 4.3 | 0.6 | 38 | 4.8 | 0.1 | 43 | 5.4 | 1.6 |
| 12 | 50 | 4.2 | 0.5 | 55 | 4.6 | 0.1 | 59 | 4.9 | 1.1 |
| 14.9 | 60 | 4 | 0.3 | 72 | 4.8 | 0.1 | 71 | 4.4 | 0.6 |
| 16 | | | | | | | | | |
| 18 | 70 | 3.9 | 0.2 | | | | 79 | 4 | 0.2 |
| 20 | | | | 86 | 4.3 | 0.4 | | | |
| 22 | 82 | 3.7 | 0 | | | | 87 | 3.6 | 0.2 |
| 24 | | | | 93 | 3.9 | 0.8 | | | |
| 26 | 91 | 3.5 | 0.2 | | | | 90 | 3.2 | 0.6 |
| 27 | | | | 96 | 3.6 | 1.1 | | | |
| 28 | | | | | | | | | |
| 30 | 98 | 3.3 | 0.4 | 96 | 3.2 | 1.5 | 94 | 3.1 | 0.7 |
| 32 | 99 | 3.1 | 0.6 | | | | 96 | 3 | 0.8 |
| 33 | 100 | 3 | 0.7 | | | | | | |
| 36 | | | | | | | 98 | 2.7 | 1.1 |
| 39.6 | | | | | | | 100 | 2.5 | 1.3 |
| Average | | 3.7 | 0.375 | | 4.7 | 0.73 | | 3.8 | 0.88 |

The data show that in Recipe 1 in which the oxidant employed was oxidized Santomerse 3, the polymerization was much more uniform over the entire range of conversion. The oxidized material of this invention was prepared by oxidizing the Santomerse 3 in a circulating air drier maintained at 175 to 185° F. for 9 days.

EXAMPLE VI

Oxidized Santomerse 3 was employed as the oxidant in the following 41° F. emulsion polymerization recipe:

| | Parts by weight |
|---|---|
| Butadiene | 70 |
| Styrene | 30 |
| Water | 180 |
| KOSR soap | 4 |
| KCl | 0.3 |
| Tertiary dodecyl mercaptan | 0.24 |
| Oxidized Santomerse 3 (0.47% active oxygen) | [2] 0.408 |
| FeSO$_4$·7H$_2$O | [3] 0.05 |
| Sodium formaldehyde sulfoxylate | 0.04 |
| KOH | 0.05 |
| Sequestrene AA [1] | 0.04 |

[1] Ethylene diamine tetraacetic acid.
[2] 0.19 mmole.
[3] 0.18 mmole.

Polymerization data

| Time, hours | Conversion, percent |
|---|---|
| 1 | 10 |
| 2 | 21 |
| 4 | 42 |
| 8 | 80 |
| 12 | 91 |
| 14 | 95 |
| 16 | 98 |
| 18 | 100 |

This shows a uniform conversion rate to 80 percent conversion and that complete conversion is possible using the sulfonates of this invention.

EXAMPLE VII

Oxidized Santomerse 3 was employed as the oxidant in the following 41° F. emulsion polymerization recipe:

| | Parts by weight |
|---|---|
| Butadiene | 70 |
| Styrene | 30 |
| Water | 180 |
| KOSR soap | 4 |
| Na$_2$SO$_3$ | 0.3 |
| Oxidized Santomerse 3 (0.47% active oxygen) | [1] 1.0 |
| Triethylenetetramine | [2] 0.146 |
| Tertiary dodecyl mercaptan | 0.44 |

[1] 0.3 mmole.
[2] One mmole.

The following polymerization data were obtained:

| Time, hours | Conversion, percent |
|---|---|
| 3.0 | 30 |
| 9.7 | 73 |

EXAMPLE VIII

A 70/30 butadiene/styrene copolymer was prepared in a 41° F. emulsion polymerization system using oxidized Santomerse 3 as the oxidant. The recipe was as follows:

| | Parts by weight |
|---|---|
| Butadiene | 70 |
| Styrene | 30 |
| Water | 180 |
| KOSR soap | 4 |
| KCl | 0.3 |
| Tertiary dodecyl mercaptan | 0.4 |
| Oxidized Santomerse 3 (0.47% active oxygen) | [1] 0.5 |
| FeSO$_4$·7H$_2$O | [2] 0.056 |
| K$_4$P$_2$O$_7$ | [2] 0.066 |

[1] 0.15 mmole.
[2] 0.2 mmole.

Di-tert-butylhydroquinone (0.2 part per 100 parts monomers) was added as a shortstop and the antioxidant employed was phenyl-beta-naphthylamine (2.0 parts used per 100 parts rubber). A conversion of 69 percent was reached in 7 hours. Coagulation was effected by the salt-alcohol-method. The polymer had a Mooney value (ML-4) of 45.

The copolymer was compounded in accordance with the following tread formulation:

| | Parts by weight |
|---|---|
| Copolymer | 100 |
| Carbon black (Philblack 0) | 50 |
| Zinc oxide | 3 |
| Sulfur | 1.75 |
| Stearic acid | 1.0 |
| Flexamine [1] | 1.0 |
| Circo-Para [2] | 5.0 |
| Santocure [3] | 1.0 |

[1] Physical mixture containing 65 percent of a complex diarylamine-ketone reaction product and 35 percent of N,N'-diphenyl-p-phenylenediamine.
[2] Circosol–2XH: A petroleum hydrocarbon softener, containing hydrocarbons of high molecular weight, in the form of a heavy, viscous, transparent, pale green, odorless liquid of low volatility; sp. gr. 0.940; Saybolt Universal viscosity at 100° F., about 200 seconds. Para Flux: Saturated polymerized hydrocarbon.
[3] N-cyclohexyl-2-benzothiazylsulfenamide.

The stock was cured 30 minutes at 307° F. and physical properties were determined. The following results were obtained:

Unaged:
| | |
|---|---|
| Compression set, percent | 17.5 |
| 300 percent modulus, p. s. i., 80° F | 1510 |
| Tensile, p. s. i., 80° F | 3330 |
| Elongation, percent, 80° F | 555 |
| 200° F. maximum tensile, p. s. i | 2020 |
| $\Delta T°$ F | 71.3 |
| Resilience, percent | 60.3 |
| Flex life, thousands of flexures to failure | 10.5 |
| Shore hardness | 58 |
| Compounded MS–1½ | 36 |
| Extrusion at 250° F.: | |
| Inches/min. | 40 |
| Grams/min. | 93 |

Oven aged 24 hours at 212° F.:
| | |
|---|---|
| 300 percent modulus, p. s. i., 80° F | 2560 |
| Tensile, p. s. i., 80° F | 3160 |
| Elongation, percent, 80° F | 365 |
| $\Delta T°$ F | 59.1 |
| Resilience, percent | 65.7 |
| Flex life, thousands of flexures to failure | 9.4 |
| Shore hardness | 64 |

Oven aged 3 days at 212° F.:
| | |
|---|---|
| 300 percent modulus, p. s. i., 80° F | 3030 |
| Tensile, p. s. i., 80° F | 3330 |
| Elongation, percent, 80° F | 325 |

We claim:

1. In the polymerization of an unsaturated organic compound containing an active $CH_2=C<$ group, and polymerizable in aqueous emulsion to produce a linear polymer of high molecular weight, while dispersed in an aqueous medium at a polymerization temperature, the improvement which comprises effecting said polymerization in the presence of an oxidized alkylbenzene sulfonate as a polymerization initiator, said sulfonate being selected from the group consisting of sodium, potassium, and ammonium alkylbenzene sulfonates.

2. In the polymerization of an unsaturated organic compound containing an active $CH_2=C<$ group, and polymerizable in aqueous emulsion to produce a linear polymer of high molecular weight, while dispersed in an aqueous medium at a polymerization temperature, the improvement which comprises effecting said polymerization in the presence of a compound selected from the group consisting of sodium, potassium, and ammonium alkylbenzene sulfonates having an alkyl group containing 8 to 20 carbon atoms attached to the benzene ring, said compound having been oxidized to an active oxygen content of at least 0.05 percent by weight.

3. In the polymerization of monomeric material comprising a major portion of 1,3-butadiene and a minor portion of styrene while dispersed in an aqueous emulsion to produce a linear polymer of high molecular weight, at a polymerization temperature, the improvement which comprises effecting said polymerization in the presence of oxidized sodium dodecylbenzene sulfonate, the active oxygen content of said oxidized material being at least 0.05 percent by weight.

4. In the polymerization of monomeric material comprising a major portion of 1,3-butadiene and a minor portion of styrene while dispersed in an aqueous emulsion to produce a linear polymer of high molecular weight, at a polymerization temperature, using a ferrous sulfate/potassium pyrophosphate recipe, the improvement which comprises effecting said polymerization in the presence of oxidized sodium dodecylbenzene sulfonate, the active oxygen content of said oxidized material being at least 0.05 percent by weight.

5. In the polymerization of monomeric material comprising a major portion of 1,3-butadiene and a minor portion of styrene while dispersed in an aqueous emulsion to produce a linear polymer of high molecular weight, at a polymerization temperature, using a peroxamine recipe, the improvement which comprises effecting said polymerization in the presence of oxidized sodium dodecylbenzene sulfonate, the active oxygen content of said oxidized material being at least 0.05 percent by weight.

6. In the polymerization of monomeric material comprising a major portion of 1,3-butadiene and a minor portion of styrene while dispersed in an aqueous emulsion to produce a linear polymer of high molecular weight, at a polymerization temperature, using a sulfoxylate recipe, the improvement which comprises effecting said polymerization in the presence of oxidized sodium dodecylbenzene sulfonate, the active oxygen content of said oxidized material being at least 0.05 percent by weight.

7. The method of preparing an oxidized alkylbenzene sulfonate comprising subjecting a compound selected from the group consisting of sodium, potassium, and ammonium alkylbenzene sulfonates having a total of 8 to 20 carbon atoms in alkyl groups attached to the benzene nucleus, to oxidation in the presence of a free-oxygen containing gas for a time sufficient to give an active oxygen content of at least 0.05 percent by weight.

8. The method of preparing an oxidized alkylbenzene sulfonate comprising subjecting a compound selected from the group consisting of alkali metal and ammonium alkylbenzene sulfonates having a total of 8 to 20 carbon atoms in alkyl groups attached to the benzene nucleus, to oxidation in the presence of a free-oxygen containing gas for a time sufficient to give an active oxygen content of 0.05 to 2 percent by weight.

9. The process of claim 1 wherein less than 100 parts of water are used per 100 parts by weight of monomers.

10. The method of preparing an oxidized alkylbenzene sulfonate comprising subjecting a compound selected from the group consisting of alkali metal and ammonium alkylbenzene sulfonates having a total of 8 to 20 carbon atoms in alkyl groups attached to the benzene nucleus, to oxidation in the presence of a free-oxygen containing gas for 2 to 10 days at a temperature within the range of 60 to 100° C. and recovering an oxidized alkylbenzene sulfonate having an active oxygen content of 0.05 to 2 percent by weight.

References Cited in the file of this patent

UNITED STATES PATENTS

| 2,524,084 | Rust et al | Oct. 3, 1950 |
| 2,537,642 | Bebb | Jan. 9, 1951 |

OTHER REFERENCES

Whitby: "Synthetic Rubber," John Wiley and Sons, Inc.; copyright Sept. 15, 1954; pages 217 and 261–268.